Jan. 19, 1932. J. F. ROBERTS 1,842,204
STERILIZING CABINET
Filed Sept. 29, 1930
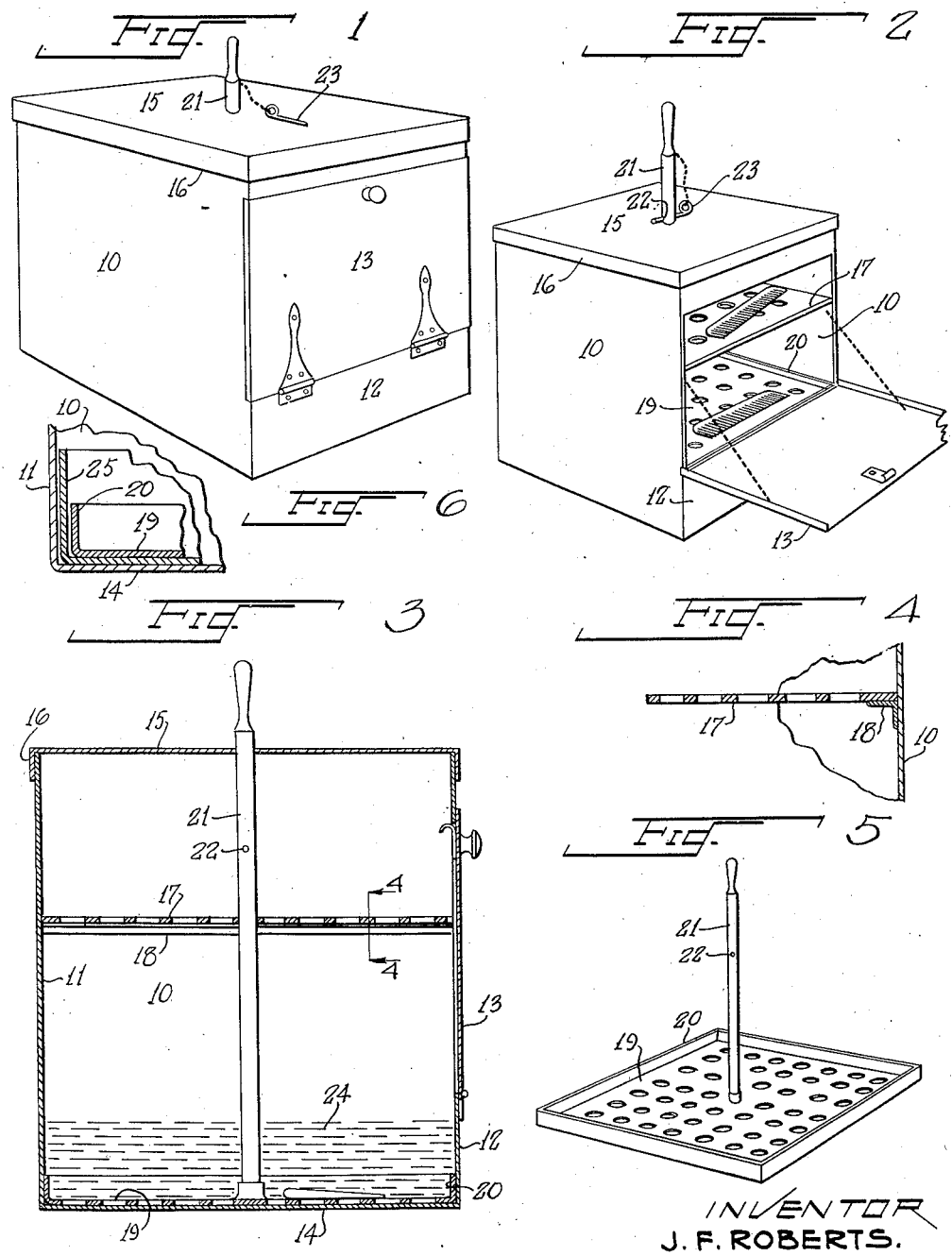
INVENTOR
J. F. ROBERTS.
BY
ATTORNEY Patented Jan. 19, 1932

1,842,204

UNITED STATES PATENT OFFICE

JOHN F. ROBERTS, OF PORTLAND, OREGON

STERILIZING CABINET

Application filed September 29, 1930. Serial No. 485,024.

This invention relates generally to the tonsorial art, and particularly to sterilizing cabinets for combs, brushes and other barber equipment.

The main object of this invention is to provide a form of sterilizing cabinet wherein objects may be sterilized either in a liquid sterilizing agent or in the fumes arising therefrom.

The second object is to provide a sterilizing cabinet wherein barber shop equipment may be easily and thoroughly sterilized in a very short space of time.

The third object is to so construct the cabinet that it will be simple to manufacture and operate and which will possess no parts which are easy to get out of order.

These, and other objects, will become more apparent from the specification following as illustrated in the accompanying drawings, in which:

Fig. 1 is a perspective view of the closed cabinet.

Fig. 2 is a perspective view of the cabinet with the door open.

Fig. 3 is a vertical section through the cabinet.

Fig. 4 is a fragmentary section along the line 4—4 in Fig. 3.

Fig. 5 is a perspective view of the emersing tray.

Similar numbers of reference refer to similar parts throughout the several views.

Referring in detail to the drawings, there is shown a somewhat rectangular cabinet consisting of the sides 10, a back 11 and a front 12 which is provided with a door 13, preferably hinged downwardly as shown, although this may of course be hinged at either side to suit the convenience.

The bottom 14 is liquid tight and forms a tank in connection with the sides 10 and 11 and the lower portion of the front 12, in which is placed a liquid disinfectant such as formaldehyde or any other disinfecting agent.

Over the top of the cabinet is placed a removable cover 15 whose downturned edges 16 extend over the upper edge of the cabinet. Within the cabinet is placed a stationary perforated shelf 17 which is removably mounted therein on the angle bar cleats 18. Within the cabinet below the shelf 17 is placed the emersion tray 19 having upturned edges 20 and a vertical rod 21 secured to same, which rod passes upwardly through the shelf 17 and the cover 15. The rod 21 is provided with a hole 22 through which may be placed the pin 23 for the purpose of holding the tray 19 above the surface of the liquid disinfectant 24.

The structure above described may of course be made of metal, glass or other suitable material, either entirely of one material or in different combinations to suit the requirements, without departing from the spirit of this invention.

In some instances it will be found desirable to provide a separate tray 25 in the bottom of the cabinet to expedite the changing of the liquids therein.

In the operation of this device those objects requiring emersion in the disinfectant 24 are placed on the tray 19—that is, such objects as brushes and combs, after which the pin 23 is removed from the rod 21 and the entire tray lowered into the liquid, preferably being moved upwardly and downwardly for the purpose of agitating the liquid and causing a washing action to take place. After the tray has been submerged for several minutes it may be raised out of the liquid and held in a raised position by means of the pin 23 permitting the parts to drip dry.

Other objects such as clippers, shears, aprons, etc. which it is not desired to emerse are sterilized sufficiently by the fumes arising from the disinfectant. Obviously, the cabinet should be made fairly tight to completely confine those fumes arising from the liquid.

In order to expedite the changing of the liquid either the tray 25 may be employed or the tray 19, together with the shelf 17 and cover 15, may be removed bodily and the contents poured from the cabinet over one of its upper rearmost corners.

I claim:

1. A sterilizing cabinet consisting of a rectangular box-shaped structure having a door mounted on one side thereof and having a reservoir in the bottom of said cabinet in combination with a vertically slidable emersing tray mounted in said cabinet, and a removable cover over said cabinet.

2. A sterilizing cabinet having an opening formed in one side thereof, a reservoir for a disinfecting solution the top edge of which is below the bottom of the door, an emersing tray in said cabinet adapted to be lowered into said reservoir, a shelf in said cabinet removably mounted over said emersing tray adapted to occupy a fixed position with relation to the cabinet, a cover over the top of said cabinet, and a rod passing downwardly through said cover and shelf having means for fastening same to said tray as well as means for holding same in an elevated position.

JOHN F. ROBERTS.